Jan. 31, 1933.  R. M. ROWELL  1,895,942
TELEMETRIC SUMMATION SYSTEM
Filed March 23, 1927  3 Sheets-Sheet 1

Inventor:
Ralph M. Rowell,
by
His Attorney.

Inventor:
Ralph M. Rowell,
by *His Attorney.*

Patented Jan. 31, 1933

1,895,942

UNITED STATES PATENT OFFICE

RALPH M. ROWELL, OF LYNN, MASSACHUSETTS, ASSIGNOR TO GENERAL ELECTRIC COMPANY, A CORPORATION OF NEW YORK

TELEMETRIC SUMMATION SYSTEM

Application filed March 23, 1927. Serial No. 177,699.

My invention relates to a system for averaging the readings of two or more indicating devices and giving an indication of such average at any desired point in terms of the summation of such indications.

In large electric power systems it ofttimes becomes desirable to obtain an indication of the total power delivered by two or more generator units or stations at a load control point or points which may be some distance from the point or points at which the individual loads are metered. In any such system a certain amount of flexibility is desirable to meet changing conditions such as the addition of generating units, or the change in location of the control station. My invention relates to a telemetric summation system of general application having the desirable features of simplicity, accuracy and reliability.

In my Patent No. 1,732,987, October 22, 1929, I have described a telemetric summation system employing a plurality of polyphase position transmitters and a polyphase receiver interconnected through transformers which serve to transform currents of the transmitters into a resultant average current in such a way that the receiver operated thereby is caused to give an indication which is an average of the several indications of the transmitters. The present invention relates to a novel scheme of connections for such a system which may be used with or without transformers.

Figure 2:
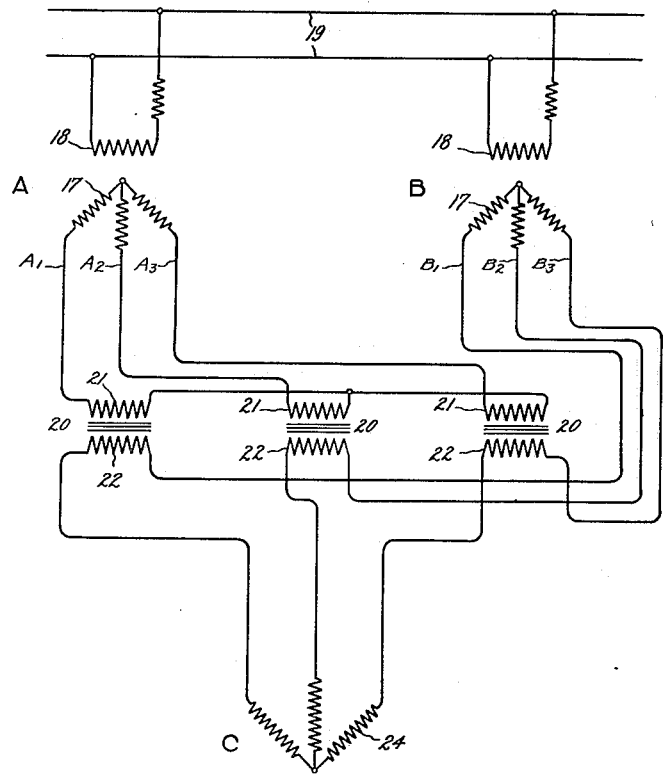
Figure 3:
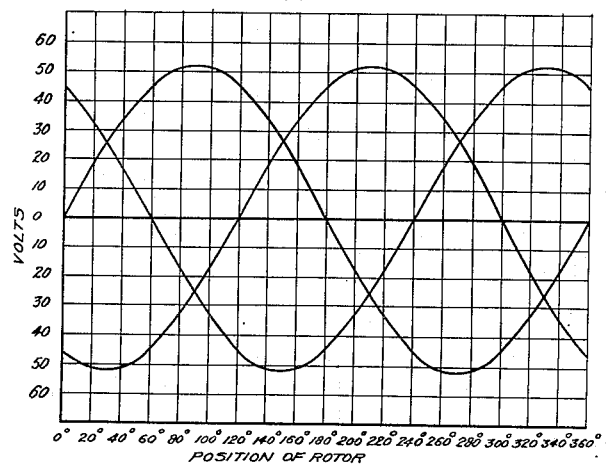
Figure 4:
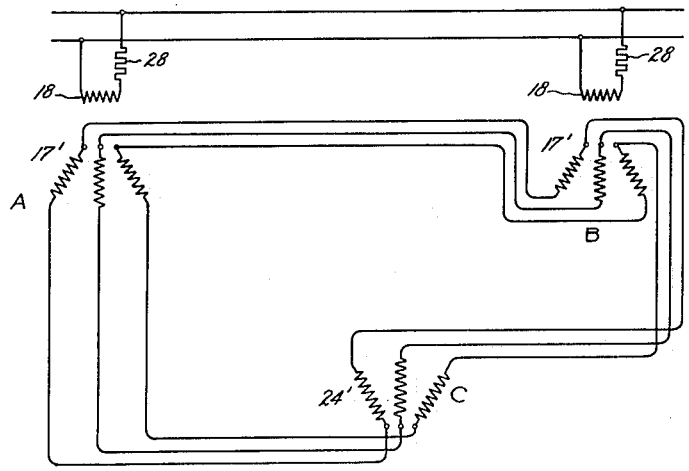
Figure 5:
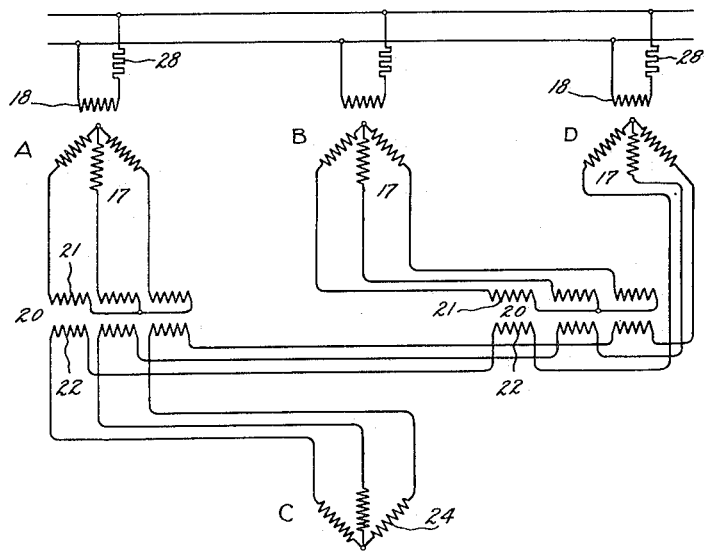

The features of my invention which are believed to be novel and patentable will be pointed out in the claims appended hereto. For a better understanding of my invention reference is made, in the following description, to the accompanying drawings which show in Fig. 1 the apparatus employed in carrying out my invention; Fig. 2 shows the electrical connections for the system shown in Fig. 1; Fig. 3 shows voltage position curves which will be referred to in explaining the invention; Fig. 4 shows a system equivalent to that of Fig. 3 where transformers are not employed; and Fig. 5 shows how the system of Fig. 3 may be extended.

Figure 1:
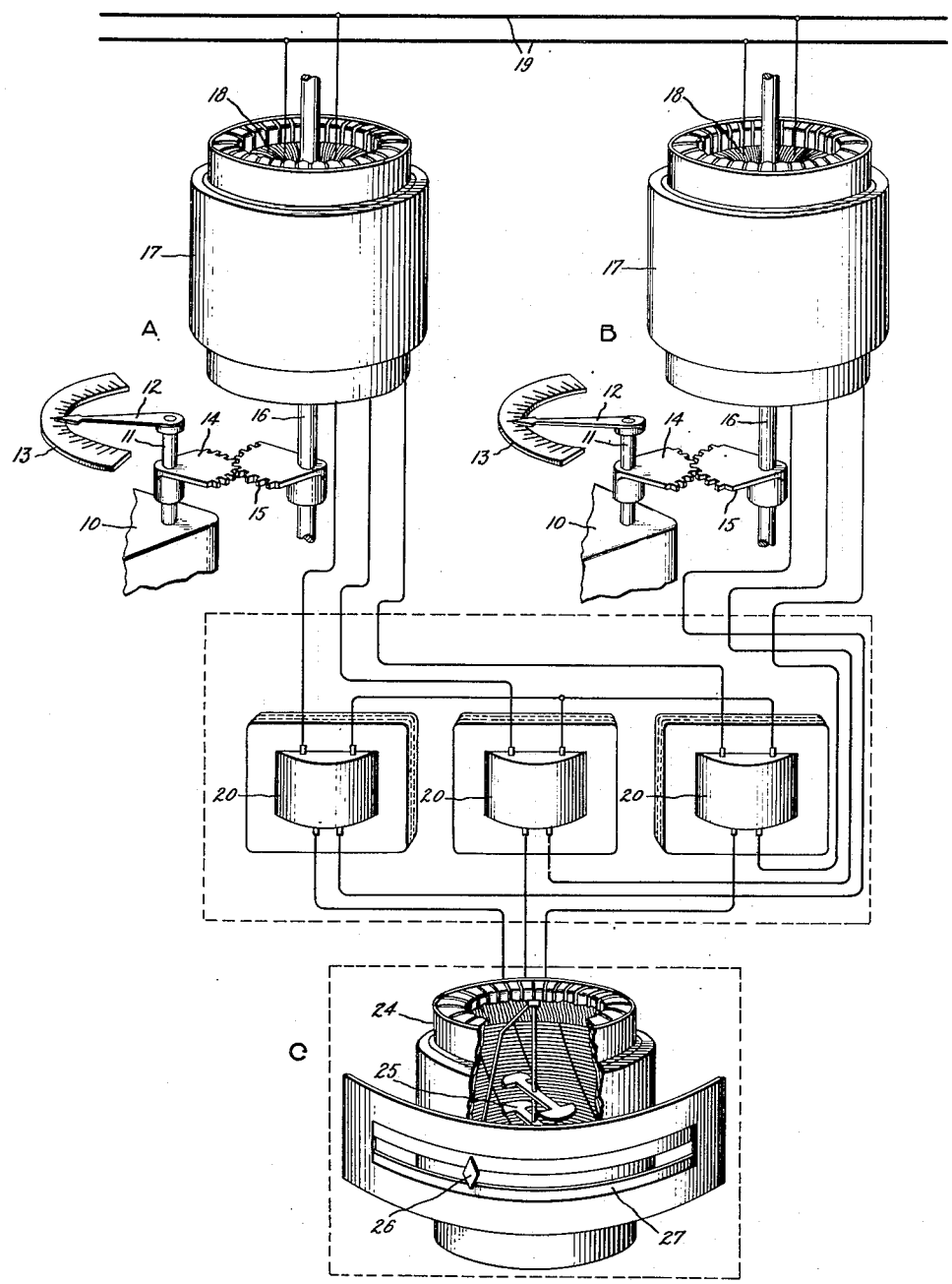

Referring to Fig. 1, A and B represent transmitting stations and C a receiving station. The apparatus illustrated is to average position indications at stations A and B and transmit the result to station C and there reproduce it in the form of an average or summation indication. At stations A and B there is provided position indicators 10 which may be wattmeters or any other indicating devices. Said devices are provided with rotatable shafts 11 carrying indicating pointers 12 which cooperate with scales 13. Shafts 11 are provided with gear sectors 14 which mesh with gear sectors 15 on the shafts 16 of electric position transmitters. As shown more clearly in Fig. 2, these transmitters are provided with polyphase stators 17 and single phase rotors 18. The rotors of all the transmitters are energized from a common single phase source of supply indicated at 19. The stator windings are connected in star and are represented as three phase.

For this installation I provide three similar transformers 20, each having two windings 21 and 22. The windings 21 are primary windings connected in star to the terminals of the stator winding 17 at station A. At the receiving station C, I provide a receiver having a star-connected stator 24 and a rotor comprising one or more magnetic bars 25 mounted on a shaft which carries an indicating pointer 26. The rotor of this instrument may be like that of the transmitters if energized from the same A C source. The pointer 26 cooperates with an indicating scale 27. The secondary windings 22 of the three transformers are connected in series with the stator winding 17 at station B and the stator winding 24 at station C. It will be noticed that currents from the two transmitters 17 flow through the primary and secondary windings in opposite directions assuming that said stator windings produce voltages in the same direction. As a result the voltage of stator 17 at station B is in the same direction across the secondary windings 22 as the voltage induced in said windings from the primary windings 21 under the assumption just made. Consequently, such voltages will add and produce currents in the secondary circuits which are proportional to the average voltages of the corresponding phases of stators 17 of stations A and B.

Fig. 3 shows how the voltages vary across the three phases of the transmitting devices when their rotors are turned through 360 degrees. These curves resemble a three-phase sine wave voltage curve but they should not be confused with such since the abscissa represents position and not time. The apparatus should be initially adjusted so that when the indicators at stations A and B give a zero scale deflection the effective voltages conducted and induced in any one secondary circuit from stators 17 at stations B and A are equal and in the same direction and the pointer of the receiving instrument should then be adjusted to give the same angular indication as the transmitters. Thus at zero indication corresponding to zero angle in Fig. 3 the voltages across phases A1 A3 and B1 B3 are both zero. The voltages across A2 A3 and B2 B3 are both 45 volts and the voltages across A1 A2 and B1 B2 are both 45 volts in the opposite direction. Currents corresponding to these voltages will flow in the secondary circuits and produce a field in the stator 24 along the same axis as the fields in stators 17. The magnetic bar rotor of the receiver will align itself with this field. Now, if one of the rotors 18 rotates to say 45 degrees, the voltages in the corresponding stator winding 17 will shift and the axis of the field produced in stator 24 of the receiver will be rotated by one-half of this amount, or 22½ degrees, because the currents in this stator are equally influenced by the two transmitters due to the averaging produced by the transformer connections. As a result the scale of the receiving instrument, if given a value of double that of the transmitting instrument scales, will indicate at all times the sum of the values indicated at the transmitting stations.

Fig. 4 shows an equivalent arrangement where the transmitter voltages are added directly instead of inductively. In this arrangement the star connections are omitted and the windings of the two transmitters 17' are connected in series with the stator windings 24' of the receiver. No transformers are required but it will generally be more desirable to employ the arrangement of Figs. 1 and 2 because in Fig. 4 six leads are required instead of three to connect up the receiver and where the receiver is located any considerable distance from the sending stations the transformers will be less expensive than the additional leads.

The invention is applicable to the summation of any number of indications as will be apparent from Fig. 5 which shows the system as used for obtaining an indication at station C corresponding to the sum of the indications at stations A, B and D. Two sets of three transformers are employed, the primary windings 21 of each set being connected in star to the stator windings at one of the transmitting stations and the secondary windings 22 of corresponding phases being connected in series with the stator windings of the transmitter at the remaining station D and with the stator windings at the receiving station C. Thus to sum up, N indications 3(N−1) transformers are required. The value of the scale on the receiving instrument will correspond to N times the value of the scale on any transmitting instruments. It will thus be seen that an existing system may be readily changed to sum up a different number of indications.

In such systems the voltages applied to the two windings of any one transformer may be different and may even be in opposite directions in which case the resultant secondary voltage will be the algebraic sum. Such conditions will react on the transmitters to a certain extent and tend to make the transmitters occupy false positions. To guard against this, the torque of the position indicating devices 10 should be large with respect to the torque of the electrical transmitters themselves. The torque of the transmitters may be reduced and properly adjusted by inserting resistances 28 in their energizing circuits. Differences in the scale values and length of scale of the various transmitters in any system may be taken care of by varying the number of turns in the transformer windings and by varying the gear ratio at 14, 15. Indications may be subtracted as well as added by this scheme and when I use the expression summation, or its equivalent, I use it in the broad sense of algebraic summation.

In accordance with the provisions of the patent statutes, I have described the principle of operation of my invention, together with the apparatus which I now consider to represent the best embodiment thereof, but I desire to have it understod that the apparatus shown is only illustrative and that the invention can be carried out by other means.

What I claim as new and desire to secure by Letters Patent of the United States is:

1. A telemetric summation system comprising a plurality of electrical position transmitting devices and an electrical position receiving device, said devices having relatively movable inductively related elements, including a winding on at least one element of each device, direct electrical connections between the windings of one of said transmitting devices and the receiving device, and electrical means included in said connections and energized from the windings on the remaining transmitting device or devices for modifying the signalling current flowing to the receiving device.

2. A telemetering summation system comprising a plurality of alternating current position signal transmitting devices, an alternating current position signal receiving device, said devices having relatively movable inductively related elements including a winding on at least one element of each device, direct electrical connections between the windings of one of said transmitting devices and the receiving device and inductive transformer connections between the windings of the remaining transmitting device or devices and the receiving device.

3. A telemetric summation system comprising a plurality of electric signal transmitting devices and an electric signal receiving device, said devices having relatively movable inductively related elements, including winding on at least one element of each device, and transformer means directly and inductively connected between the windings of said receiving and transmitting devices for averaging the transmitting signals.

4. A telemetric position summation system comprising a plurality of electric signal transmitting devices, an electric signal receiving device, said devices having relatively movable inductively related elements including a winding on at least one element of each device, transformers having secondary windings connected in series with the windings of the receiving device and one of the transmitting devices and primary windings connected to the winding of another of said transmitting devices, said transformers serving to average the signals transmitted therethrough, and means for energizing said system from an alternating current source.

5. A telemetric summation system comprising a plurality of transmitting devices, a signal receiving device, said devices having a relatively movable inductively related elements including polyphase windings on one element of each of said devices, a transformer for each phase of said system having a primary winding connected to the winding of one of said transmitting devices, and a secondary winding connected in series with the corresponding phases of the windings of another transmitting device and the receiving device.

6. A telemetric summation system comprising N transmitting devices and a receiving device, said devices having relatively movable inductively related elements including a winding of X phases on one element of each device, X(N−1) single phase transformers having primary and secondary windings, said primary windings being respectively connected to the several different phases of (N−1) of said transmitting devices, the remaining transmitting device having its winding connected in series with the secondary windings of said transformers and with the winding of said receiver so that corresponding phases of all of the transmitting devices and the receiving device are inductively or directly connected, and means for energizing each transmitting device from a common alternating current source.

In witness whereof, I have hereunto set my hand this eighteenth day of March, 1927.

RALPH M. ROWELL.

CERTIFICATE OF CORRECTION.

Patent No. 1,895,942.   January 31, 1933.

RALPH M. ROWELL.

It is hereby certified that error appears in the printed specification of the above numbered patent requiring correction as follows: Page 3, line 16, claim 3, after "including" insert the article "a"; and line 40, claim 5, strike out the article "a"; and that the said Letters Patent should be read with these corrections therein that the same may conform to the record of the case in the Patent Office.

Signed and sealed this 28th day of February, A. D. 1933.

M. J. Moore,
Acting Commissioner of Patents.